Oct. 25, 1966 W. A. ALEXANDER 3,281,852
METHOD FOR RECORDING SEISMIC DATA
Filed Sept. 3, 1965
3 Sheets-Sheet 1

WARREN A. ALEXANDER INVENTOR.

BY *Gary C. Honeycutt*

ATTORNEY

Oct. 25, 1966    W. A. ALEXANDER    3,281,852
METHOD FOR RECORDING SEISMIC DATA
Filed Sept. 3, 1965    3 Sheets-Sheet 2

WARREN A. ALEXANDER  *INVENTOR.*

BY *Gary C. Honeycutt*

*ATTORNEY*

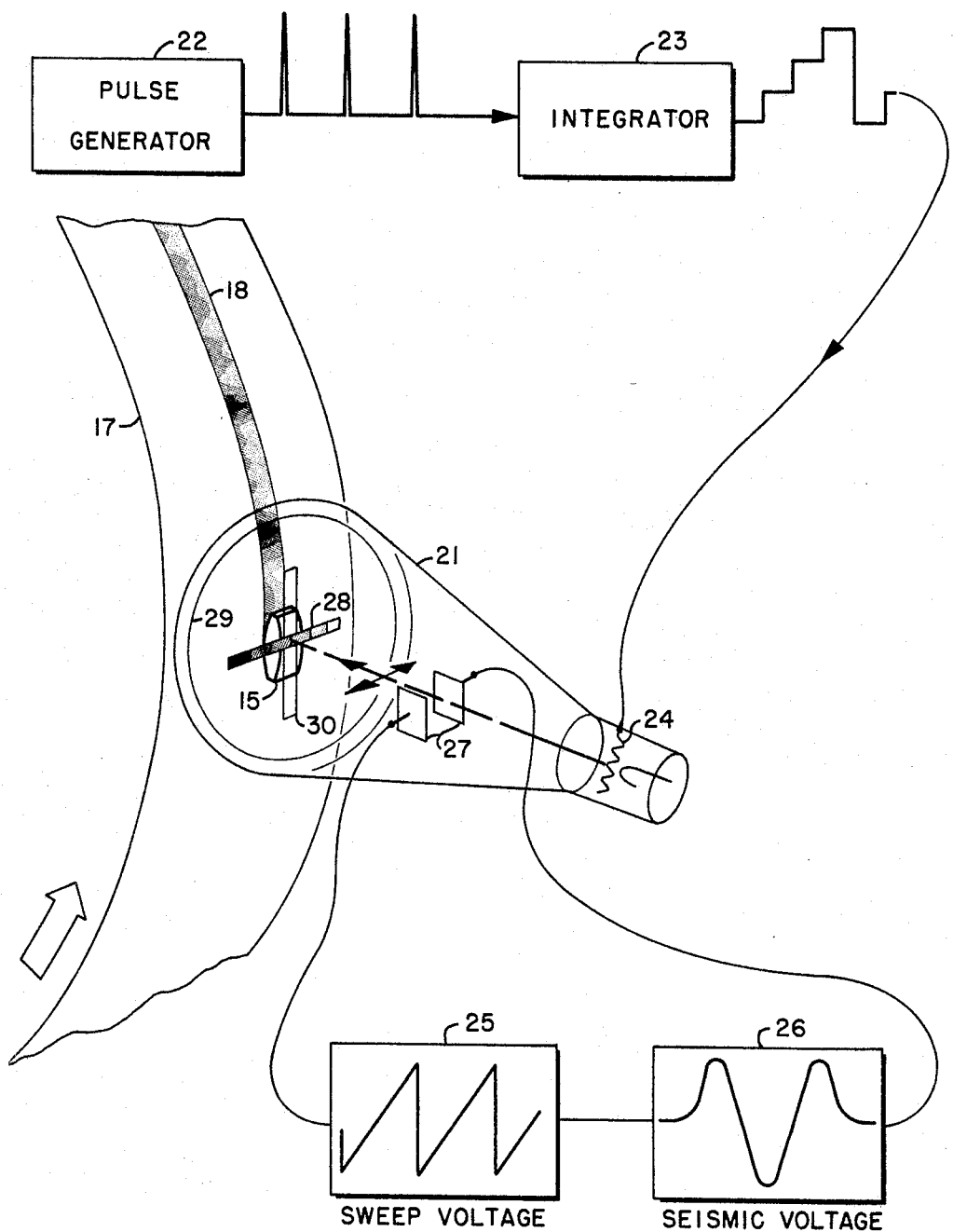

United States Patent Office 3,281,852
Patented Oct. 25, 1966

3,281,852
METHOD FOR RECORDING SEISMIC DATA
Warren A. Alexander, Houston, Tex., assignor to Esso Production Research Company, a corporation of Delaware
Filed Sept. 3, 1965, Ser. No. 485,041
6 Claims. (Cl. 346—1)

This invention is a continuation-in-part of U.S. Serial No. 136,581 filed September 7, 1961 now Patent No. 3,243,820.

This invention is concerned with a method for producing a photographic record of a transient electrical signal. The invention has particular application to the making of seismograph records which are useful in geophysical exploration. More particularly, the invention provides a new form of presentation of seismograph records which has been designated the "stacked amplitude" presentation. It is a channelized recording mode which combines the features of the variable density, variable area, and oscillographic presentations. When viewed at a distance, it has the appearance of variable density and permits ease of correlation. At closer range, it appears as variable area and at still closer range, the detailed character of a conventional galvanometer record is evident. The uniqueness of this trace permits a signal of large amplitude to be recorded in a relatively narrow channel.

Recently a widely used form of presentation for seismic data has been the variable density section. A section is an assembly of seismic trace recordings from one or more seismograms which have been corrected for fixed and variable time variations. It shows the correlation of the various seismic horizons to an advantage and has been found helpful in the analysis of seismic data taken in areas of complex geology. On the other hand, the original galvanometer "wiggly trace" records show the details of the seismic signal very well and make the timing of the events more precise. Another advantage of variable density recording is the channelized form of the trace which avoids the tangle and overlap of galvanometer records. However, on the variable density section the eye can readily differentiate relatively few shades of gray between black and white. The exact number varies considerably, depending primarily upon the lighting conditions and the rate of transition from black to white. As many as ten or more shades may be distinguished with favorable circumstances, but typically, it is believed that no more than four readily appear. This seriously limits the usable dynamic range of the variable density form for displaying amplitudes and it also limits its ability to show details of seismic signals, such as cycle splitting and harmonics.

FIGURE 5 shows an alternate apparatus to be used in accordance with the invention, which illustrates the use of a cathode ray tube for producing the stacked amplitude recording.

The general procedure of preparing a seismic section is a technique that has by now become widely employed in the art of geophysical exploration and more particularly in the field of seismic prospecting. A complete description of the art of seismic prospecting is not believed necessary for the purpose of this disclosure. A complete description of seismic prospecting and a technique of printing a seismic section can be found in U.S. Patent 2,876,428.

A disclosure of the variable density form of seismic data presentation and suitable means for making such presentation can be found in U.S. Patents 2,051,153 and 2,769,683.

Figure 1:
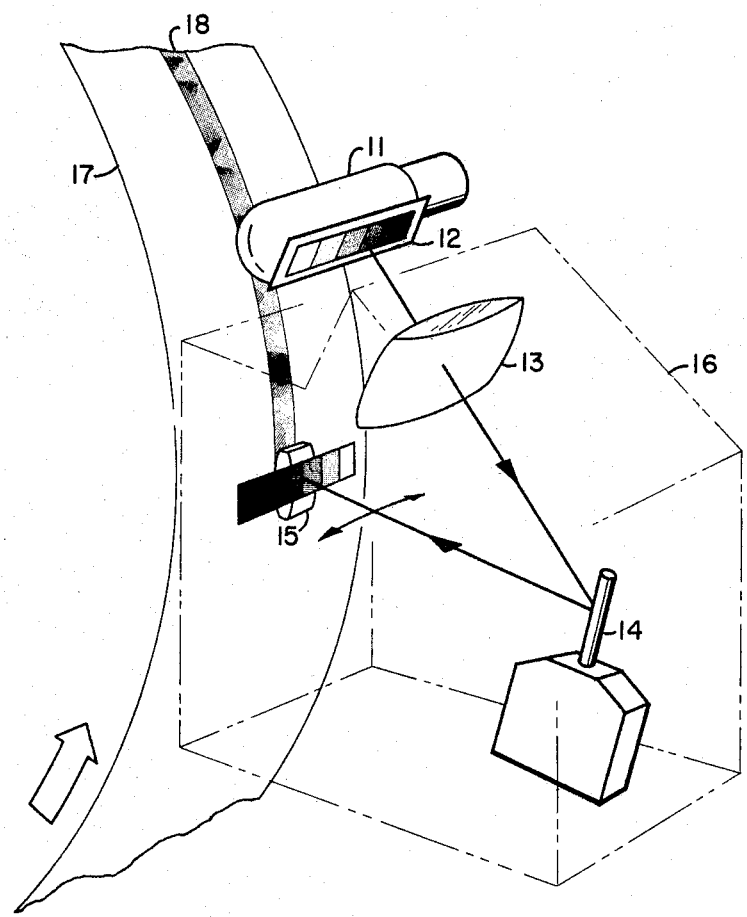
FIGURE 1 shows a suitable apparatus to be used for making the stacked amplitude recording.
Figure 2:
FIGURES 2 and 3 illustrate a seismic wavelet in variable density form and the conventional galvanometer record of the seismic wavelet, respectively, and are included for comparison with FIGURE 4 which shows the same wavelet in the stacked amplitude form of this invention.

Referring now to FIGURE 1, light from a long filament lamp 11 passes through a stacked amplitude mask 12, then through spherical lens 13 and is reflected from mirror galvanometer 14. The image of the stacked amplitude mask is thus projected across the lens 15 which is located adjacent a slit in the front of the housing 16 of the recording head assembly. Lens 15 condenses the mask image to a line image of stepped density and this line image is then focused on the photographic film, or other photosensitive medium, mounted on the record drum 17. The mask image is moved back and forth across the slit by the galvanometer mirror motion. As the record drum is revolved about its axis, the stacked amplitude trace 18 is recorded. The film is then developed, and photographic prints prepared, in a conventional manner.

Lamp 11 may be any elongated light source of sufficient intensity. A lamp which has been found particularly suitable for this purpose is the General Electric Electrophoresis lamp having a 10 v., 7 amp. rating.

Stacked amplitude mask 12 is any light filter having a stepped density as shown. Since it is frequently difficult for the human eye to differentiate readily between more than four shades of gray between black and white, it has been found convenient to select a stacked amplitude mask having four shades of gray, plus black and white, to give six levels of density or six ranges of amplitude which may be stacked within a channel. Of course, it is contemplated that any convenient number of shades of gray may be used. The boundary between two shades of gray within the channel shows the wiggly trace presentation of the signal. This boundary can be resolved to about ⅙ of the width of the channel. That is, a signal causing a deflection of the boundary between two levels of gray equal to ⅙ of the distance across the channel can be readily defined. This range from a low level of ⅙ of a channel width through five boundaries between densities gives a dynamic range of 30 to 1. This is a much wider range of signals than can be seen on the variable density presentation and is greater than that usually used on the galvanometer records if extensive trace tanging is to be avoided.

One convenient method of preparing a stacked amplitude mask is first to coat a piece of glass with a photographic emulsion. The coated glass is then shielded with strips of metal or other convenient material in a stair-stepped arrangement so that the exposed portion of the glass can be subjected to light of controlled intensity for a given period of time after which the metal strips are removed at timed intervals so that the result is an exposure of the emulsion in a stepped manner such that after all the strips of metal have been removed and the emulsion developed, the stacked amplitude mask will result.

A colored trace is prepared according to one embodiment of the invention, by using a colored mask in combination with a color sensitive photographic medium. As an example, the stacked amplitude mask 12 is prepared with eight sections; four shades of green and four shades of red, the darkest shade of green appearing at one end, and the darkest shade of red at the opposite end. The lightest shades of the respective colors appear side-by-side at the center. Thus, increasing signal amplitude appears in the printed trace as darker shades of color; one color for the positive deflections and the other for negative deflections.

Still another variation of the invention is obtained by the use of a mask in which the center section is clear, corresponding to zero amplitude, and both end sections are black, with stepped shades of gray in between. This produces a printed trace wherein zero amplitude is white, and both positive and negative peaks go toward darker grays to black.

The terms "stepped density" and "stepped intensity" as used herein are not intended to restrict the invention to embodiments wherein each step is completely unifrom in density or intensity, as shown in the drawings. Thus, each step may have its own variations in density or intensity, consistently with an overall effect characterized by successively darker or lighter sections as shown. For example, in one embodiment the boundary between each step is emphasized by providing a gradient of density or intensity near each boundary, such that the difference in density or intensity between a given step and an adjacent step is greater at their boundary than at their centers.

Lens 13 is an ordinary spherical lens which, as shown, is used to concentrate light from the lamp and bring the mask image to focus approximately in the plane of lens 15, or in the plane of said photosensitive medium. Alternatively, a spherical lens similar to lens 13, but having a shorter focal length, is placed in the path of reflected light between the galvanometer mirror and the lens 15. In the latter embodiment, a lens having the dimensions 51 mm., and a focal length of 64 mm. is convenient.

The mirror galvanometer 14 is of the conventional type used in the recording of seismic data. Its function is to receive the transient electrical signal which represents the seismic data and in response thereto its mirror is deflected proportionally to the amplitude of the applied signal and thus the reflected image position will be governed by the amount of such deflection. In its neutral or null position the mirror reflects the mask image upon the lens 15 such that the vertical and horizontal center of the image coincides with the center of the lens which in turn is centered with the aperture in the recorder head housing. A suitable galvanometer may be obtained from Centry Electronics and Instruments, Inc., of Tulsa, Oklahoma, type 201C–30–2.

Lens 15 is an ordinary cylindrical lens designed for condensing the mask image into a line image focused upon the photographic medium through the aperture of said housing. It should be particularly noted that the dimension of the slit aperture along the path of the image deflection is preferably equal to the width of one step in the projected mask image. This means, of course, that only a portion equal to one step of the mask image at a given time actually reaches the photographic medium on the record drum. The width of the trace produced is illustrated in the drawing. Lens 15 is optional and in the event of its omission the size of the aperture must define that portion of the projections which falls on the photographic medium; that is, the aperture must be a very narrow slit. As a practical matter, however, lens 15 will usually be necessary for best results, and most efficient use of the light. A lens ¾ inch x ⅜ inch, having a focal length of ⅝ inch is convenient.

The housing 16 is shown only in outline form and is any covering in which the various elements described above can be suitably mounted. An essential function of the housing is to act as a light shield, since the photographic medium must obviously be protected from any extraneous light. The housing normally encloses the light source in addition to the mask, galvanometer and lenses. The optical system thus packaged in the housing forms an apparatus unit unto itself which has been designated a stacked amplitude recording head. As such, it can be readily mounted on the second printing apparatus in the position shown with relation to the record drum. Alternatively, the photographic medium may be fed past the aperture of the recording head by any suitable mans such as rollers. The mounting of the recording head with respect thereto is similarly an obvious expedient.

Figure 4:

It will be apparent to those skilled in the art that various alternate optical arrangements will be capable of exposing the photosensitive medium to a stepped-intensity linear image of light, and will thereby produce a record substantially as shown in FIGURE 4. The use of any such variations which function to produce a stacked amplitude record is considered to be within the scope of the present invention.

Figure 3:
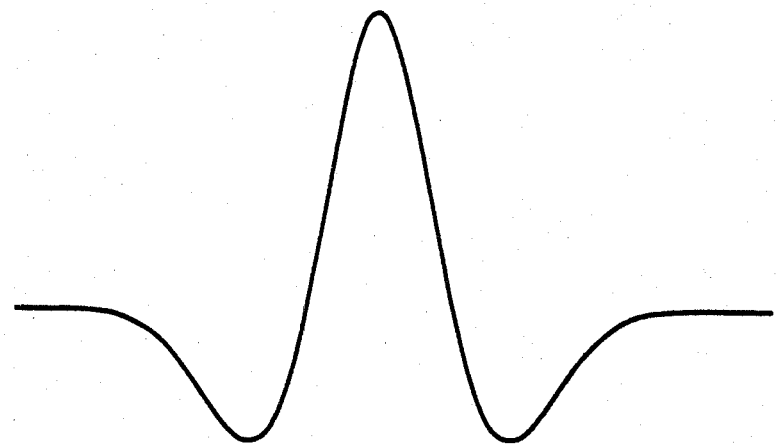

Referring to FIGURE 4, a segment of a seismic trace recorded in stacked amplitude form is shown. It is particularly significant that the entire character of the corresponding oscillographic trace (FIGURE 3) is reproduced in FIGURE 4, and that no portion of the oscillographic trace appears therein more than once. Specifically, the outline of the darkest area of FIGURE 4 duplicates the peak of the oscillographic trace. The outline of the adjacent, lighter area duplicates that portion of FIGURE 3 which lies just below the peak; the outline of the next lighter area of FIGURE 4 duplicates the next portion of FIGURE 3, etc.

The exact, segmented duplication of the oscillographic trace, as shown in FIGURE 4, would not result in the operation of the appartus shown in FIGURE 1, for example, if the width of the housing slit, or other aperture, is not made equal to the width of each step in the filter image. If the slit is too narrow, a substantial portion of the oscillographic trace is lost; and if the slit is too wide, certain portions of the oscillographic trace are duplicated more than once, thereby unnecessarily complicating efforts to interpret the final record. However, it is within the scope of the invention to employ an aperture or slit which is either more narrow than the width of each step in the filter image, or which is wider than each step in the filter image, if desired.

In FIGURE 5, cathode ray tube 21 is utilized to produce an oscillating line image of stepped light intensity in accordance with the invention. Pulse generator 22 in combination with integrator circuit 23 provides a stair-stepped voltage pattern which is applied to grid 24 of the cathode ray tube. This voltage pattern controls the brightness of the electron beam, causing it to dim abruptly from one level to the next until a minimum intensity is reached, which corresponds to the black portion of image 28. Synchronized with the grid voltage pattern, a sweep voltage 25 is added to the seismic signal 26, and the total is applied to horizontal deflection plates 27. In the embodiment shown, the frequency of pulse generator 22 is set at six times the frequency of sweep voltage, such that zero voltage is applied to the grid simultaneously with the beginning of a sweep cycle, which corresponds to the brighest area of image 28. Five pulses during each sweep cycle build up the integrator output in a step-wide manner, until maximum voltage is applied to the grid at the time a sweep cycle is five-sixths complete, which corresponds to the darkest area of image 28. The addition of the seismic voltage to the sweep voltage has the effect of oscillating the entire image 28 horizontally, in exactly the same pattern as accomplished with mirror galvanometer 14 in the embodiment of FIGURE 1.

A shield 29 having vertical slit 30 is placed between the photographic medium and the screen of tube 21. The width of the slit is the same as the length of each segment of image 28. That portion of the image which the photographic medium "sees" is brought into sharper focus by lens 15, as in the embodiment of FIGURE 1. Thus, the photographic record produced by the system of FIGURE 5 is identical to that produced by the system of FIGURE 1.

Pulse generator 22 is of any conventional design, the details of which are not essential to a complete disclosure of the invention. A suitable pulse generator may be obtained from General Radio Company, type 1391–B.

The integrator circuit 23 is any capacitor, such as a simple condenser, for storing the voltage pulses from generator 22. As mentioned above, the integrator output is synchronized with the pulse generator and with the sweep cycle. The integrator is shunted to zero simultaneously with every sixth pulse, at the beginning of each sweep cycle.

The sweep voltage 25 is generated by any conventional means, such as that usually included with most commercial oscilloscopes.

The method of this invention is not limited to the use of the specific apparatus embodiments described which have been presented by way of example only. Thus, the method of this invention contemplates broadly the recording of a transient electrical signal by exposing a photosensitive medium to a substantially straight-line image of stepped light intensity, while shielding said medium from all but a segment of said image, said segment being preferably of a length equal to one step of light intensity along said image and at the same time moving said photosensitive medium transversely to the line of said image, while causing said image to oscillate laterally with respect to the path of said projection and controlling the amplitude of said oscillation in response to the amplitude of said signal.

Although the various embodiments of the invention as described herein are concerned with single channel recording, the scope of the invention as contemplated also includes multiple channel recording. That is, each embodiment is readily adaptable to multi-channel recording, by providing multiple sets of the various components described for single channel recording, and shielding adjacent channels from interference with each other. A detailed disclosure of this expedient, as applied to variable density recording, is found in U.S. Patent 2,769,683.

What is claimed is:

1. A method for recording a variable electric signal which comprises exposing a photosensitive medium to a segment of a sharply focused, substantially straight-line image of stepped light intensity, said segment being of a length substantially equal to one step of light intensity along said image, moving said photosensitive medium transversely to the line of said image, and causing said image to oscillate laterally in accordance with variations in said signal.

2. A method for recording a variable electrical signal which comprises projecting a substantially straight-line image of stepped light intensity toward a photosensitive medium, sharply focusing a segment of said image upon said medium, said segment being of a length substantially equal to one step of light intensity along said image, moving said photosensitive medium transversely with respect to the path of said projection, oscillating said image laterally with respect to the path of said projection, and controlling the amplitude of said oscillation in response to the amplitude of said signal.

3. A method for producing a photographic record of a transient electrical signal which comprises exposing a photosensitive medium to a substantially straight-line image of stepped light intensity, shielding said medium from all but a segment of said image, said segment being sharply focused upon said medium, and of a length substantially equal to each step of light intensity along said image, moving said medium transversely to the path of said projection while causing said image to oscillate laterally with respect to the path of said projection, and controlling the amplitude of said oscillation in response to the amplitude of said transient signal.

4. A method for producing a photographic record of a transient electrical signal which comprises sharply focusing a segment of a substantially straight-line image of stepped light intensity upon a photosensitive medium, said segment being of a length substantially equal to one step of said image, adjacent steps of said image forming a discrete boundary therebetween, causing said image to oscillate along the line defined thereby, controlling the amplitude of said oscillation in response to the amplitude of said signal, and moving said photosensitive medium transversely with respect to the line of said image.

5. A method as defined by claim 4 wherein said straight-line image is multi-colored, and the darkest shades of color lie at the ends thereof.

6. A method as defined by claim 4 wherein the straight-line image is brightest at the center, and the successive steps thereof are dimmer progressing toward each end thereof.

References Cited by the Examiner

UNITED STATES PATENTS

| | | | |
|---|---|---|---|
| 2,095,317 | 10/1937 | Dimmick | 179—100.3 |
| 2,769,683 | 11/1956 | Skelton | 346—109 |
| 2,937,915 | 5/1960 | Peterson | 346—109 |
| 3,011,856 | 12/1961 | Palmer et al. | 346—33 X |
| 3,158,832 | 11/1964 | Skelton | 340—15.5 |

FOREIGN PATENTS 1,204,721   8/1959   France.

RICHARD B. WILKINSON, *Primary Examiner.*

LOUIS J. CAPOZI, *Examiner.*

JOSEPH W. HARTARY, *Assistant Examiner.*